Figure 1:
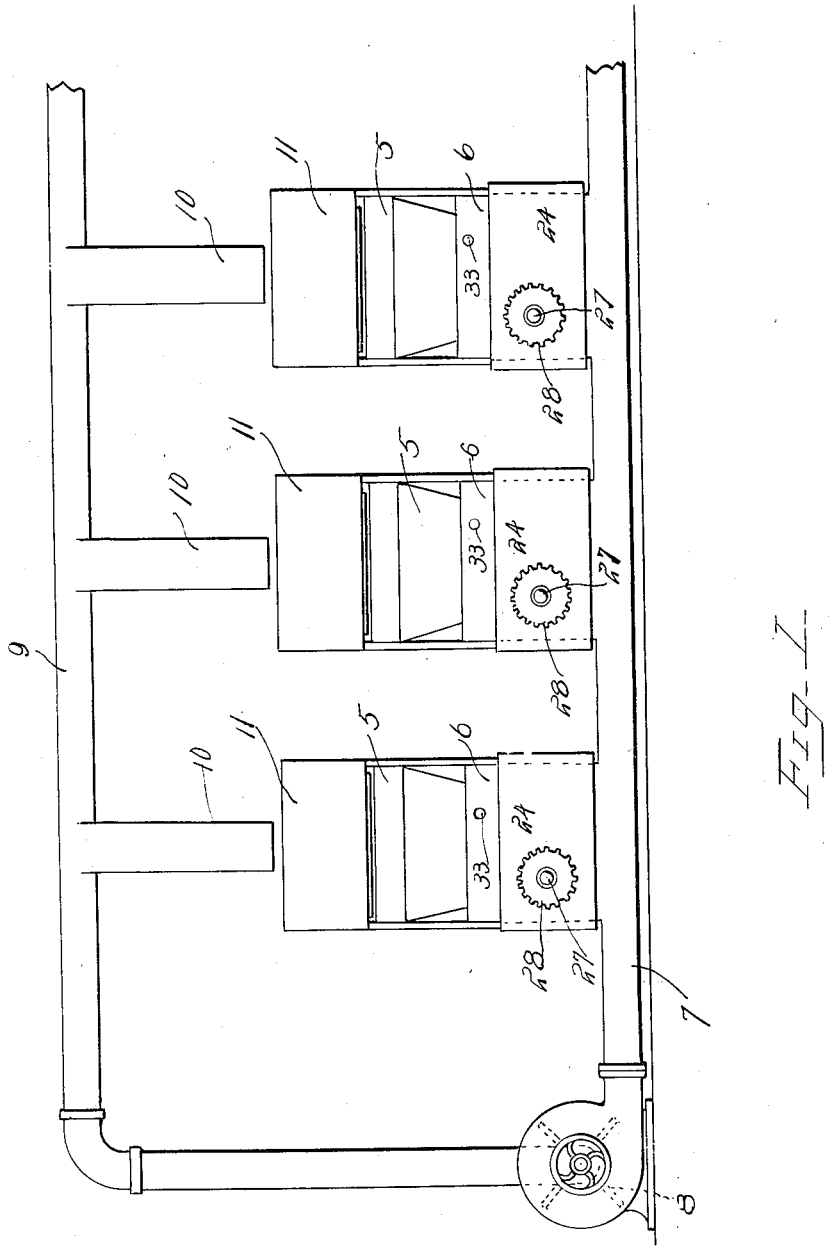

W. N. JAMES.
COTTON SEED CONVEYER.
APPLICATION FILED NOV. 12, 1909.

988,101.

Patented Mar. 28, 1911.

2 SHEETS—SHEET 1.

Witnesses
J. C. Simpson
Henry T. Bright

Inventor
William N. James.
By
Attorneys

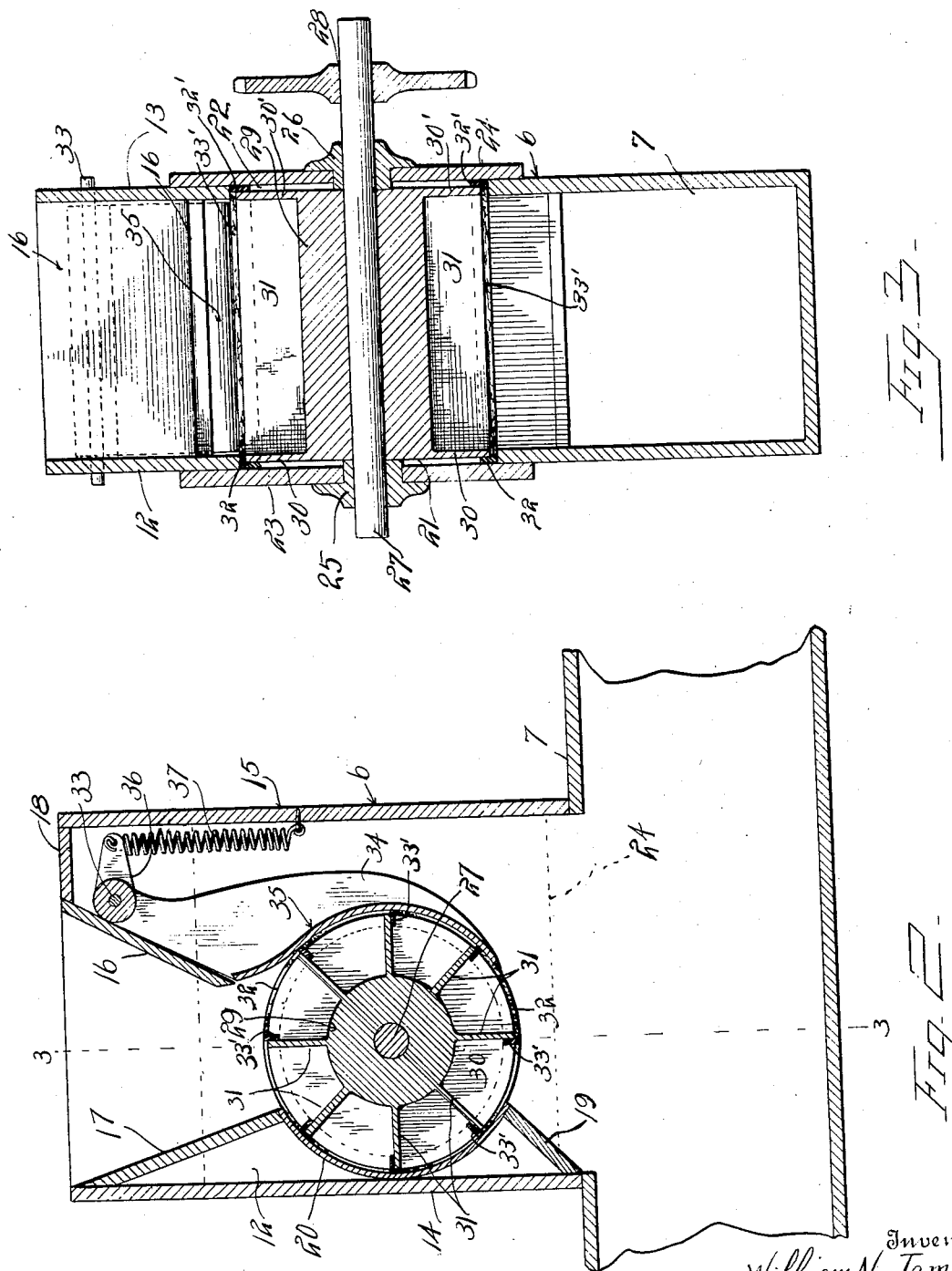

UNITED STATES PATENT OFFICE.

WILLIAM N. JAMES, OF SALLISAW, OKLAHOMA.

COTTON-SEED CONVEYER.

988,101.

Specification of Letters Patent. Patented Mar. 28, 1911.

Application filed November 12, 1909. Serial No. 527,694.

*To all whom it may concern:*

Be it known that I, WILLIAM N. JAMES, a citizen of the United States, residing at Sallisaw, in the county of Sequoyah, State of Oklahoma, have invented certain new and useful Improvements in Cotton-Seed Conveyers; and I do hereby declare the following to be a full, clear, and exact description of the invention, such as will enable others skilled in the art to which it appertains to make and use the same.

This invention relates to cotton seed conveyers, and more particularly to an improved mechanism of this type for conveying cotton seed directly from under the gin to the exhaust discharge flue.

Heretofore in removing cotton seed from gins a screw conveyer or belt carrier has been more commonly used to convey the seed directly from the gin to the cotton seed discharge flue. The employment of a screw conveyer or belt carrier is objectionable on account of subsequent choking at the point of connection with the discharge flue and besides requiring additional power to propel them and the employment of additional pulleys and belts to transmit the power to the said conveyer or belt carrier all of which are extremely liable to get out of order.

It is the object of this invention to produce a mechanism to be utilized in lieu of a screw conveyer or belt carrier which will obviate the choking common to this device and which will eliminate to a large degree the employment of a large number of pulleys and belts which require constant care and attention.

With the above and other objects in view the invention consists in the details of construction and in the arrangement and combination of parts to be hereinafter more fully described and set forth in the claim.

In describing the invention in detail reference will be had to the accompanying drawings in which like characters denote corresponding parts in the several views and in which, Figure 1 is a sectional elevation illustrating the seed conveying mechanism in operative relation to a battery of cotton gins and an ordinary cotton handling apparatus; Fig. 2, a vertical section of the improved conveyer, a fragment of the cotton seed discharge flue being shown in connection there-
with; and Fig. 3, a section on the line 3—3 of Fig. 2.

Referring to the drawings 5 designates a gin-breast. The invention may be applied to a battery of gins as shown or to one gin only. In each gin is a seed hopper which terminates at its lower end in a vertically disposed casing 6, said casing leading into the cotton seed discharge flue 7 of the fan 8 the suction of which is employed to draw seed cotton into the usual elevator flue 9 from the cotton-house or from the wagon as may be most convenient. This elevator flue 9 may be communicated with the gins 5 through ducts 10 and feeders 11 as usual.

The gin, the fan, elevator flue and cotton seed discharge flue may be of any suitable or ordinary construction and need not be particularly described, as they form no part of this invention, except in combination with the means for removing cotton seed from the gins to the exhaust flue.

The casing 6 is of rectangular cross section and comprises the side members 12 and 13 and end members 14 and 15. Disposed between the side members 12 and 13 transversely of the casing are the inclined members 16 and 17 to form a hopper like construction emptying into the lower portion of the casing. The top of the casing is closed between the inclined member 16 and end member 15 by a top member 18. Another inclined member 19 disposed transversely of the casing between the side members 12 and 13 has its upper end connected with the lower end of the inclined member 17 by an arcuate plate 20. The side members 12 and 13 of the casing are provided with corresponding alined circular apertures 21 and 22 which are closed respectively by plates 23 and 24, mounted on the outer faces of said side members 12 and 13 respectively. Said plates 23 and 24 are provided respectively with the journal bearings 25 and 26 in which is mounted a shaft 27 and carried on one end thereof is a sprocket wheel 28 adapted for connection with any suitable rotating member or members. Mounted on the shaft 27 between the plates 23 and 24 is a hub 29 which is provided at each end with annular flanges 30 and 30′ connected together by a series of longitudinal slats 31, said flanges and slats forming what is commonly known as a pocket cylinder. Disposed between plate 23 and disk 30 is an annular rubber packing 32 the outer edge of which extends slightly beyond the periphery of the disk 30. A similar packing 32' is disposed between disk 30' and plate 24 while each of the slats 31 carries at its upper longitudinal edge a packing 33', said packing 33' projecting above said edge throughout its length.

A shaft 33 is mounted between the side members 12 and 13 and carries at one end a depending member 34 from which projects laterally transversely of the casing, presser plate 35 of arcuate formation so as to be adapted to frictionally engage the cylindrical wall of the pocket cylinder. An arm 36 is also fixed upon the shaft 33 at one end thereof and a spring 37 has its upper end secured to the free end of said arm and its lower end secured to the end member of the casing and is adapted to exert a tension sufficient to rock the shaft 33 and press the plate 35 against the cylindrical wall of the pocket cylinder. It will thus be obvious from the construction just described that as the pocket cylinder is rotated should there be an overload of cotton seed fed thereto, and a tendency to choke in its passage across the plate 35 the pressure exerted by this tendency to choke will move said plate 35 outwardly against the influence of the spring 37 and permit the over load to pass by into the discharge flue, and after such passage the plate 35 will be automatically returned to its position against the pocket cylinder and prevent the blast of air present in the cotton seed discharge valve from escaping upwardly through any of the gins by way of the compartment occupied by the pocket cylinder.

What is claimed is:—

In combination, a pneumatic discharge, a conduit opening into said discharge, and a valve mechanism located in said conduit, said valve mechanism comprising a pair of downwardly tapering members connecting opposite sides of the conduit, one of said members having an arcuate extension, a rotary valve closing the space between the lower ends of said members, said valve comprising a rotatable hub, a plurality of radial slats disposed longitudinally of the hub, a packing strip secured to each slat along its outer longitudinal edge and projecting beyond said edge respectively for engagement with the arcuate extension of said member, a shaft journaled between opposite sides of said conduit, a plate carried by said shaft, an arm mounted on said shaft, a spring connection between said arm and one side of the conduit constantly tending to rotate said shaft, whereby the plate is forced against the packing strips carried by the slats and adapted to be moved outwardly therefrom against the tendency of said spring connection under the influence of the pressure exerted by an overload deposited in a pocket of said valve.

In testimony whereof, I affix my signature, in presence of two witnesses.

WILLIAM N. JAMES.

Witnesses:
KATE BELL,
WM. L. CURTIS.